(12) United States Patent
Hagimoto et al.

(10) Patent No.: US 8,662,231 B2
(45) Date of Patent: Mar. 4, 2014

(54) MOTORCYCLE (71) Applicant: Honda Motor Co., Ltd., Tokyo (JP)

(72) Inventors: Masashi Hagimoto, Wako (JP); Satoshi Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/902,854

(22) Filed: May 27, 2013

(65) Prior Publication Data
US 2014/0035252 A1 Feb. 6, 2014

(30) Foreign Application Priority Data

Jul. 31, 2012 (JP) .................................. 2012-169956

(51) Int. Cl.
B62K 11/00 (2013.01)
(52) U.S. Cl.
USPC ......................................................... 180/219
(58) Field of Classification Search
USPC ........ 180/218, 219, 220, 205.1, 205.2, 206.1, 180/207.1; 224/413, 425, 427, 428, 429, 224/435
See application file for complete search history.

(56) References Cited

U.S. PATENT DOCUMENTS

| 4,802,682 | A | * | 2/1989 | Yasuji | 180/219 |
| 5,040,632 | A | * | 8/1991 | Fujii et al. | 180/219 |
| 5,044,646 | A | * | 9/1991 | Iiga et al. | 180/219 |
| 7,735,892 | B2 | * | 6/2010 | Sakamoto et al. | 296/37.1 |
| 7,828,102 | B2 | * | 11/2010 | Yano et al. | 180/219 |

FOREIGN PATENT DOCUMENTS

JP 2001-063660 3/2001

* cited by examiner

Primary Examiner — Tony Winner
(74) Attorney, Agent, or Firm — Ditthavong Mori & Steiner, P.C.

(57) ABSTRACT

A motorcycle includes a body frame, a seat, a seat side cover, and a storage box. The seat is supported on a rear portion of the body frame. The storage box is placed below the seat. The storage box is covered with the seat side cover from an outside of the motorcycle in a vehicle width direction of the motorcycle. The lock mechanism is provided to lock and unlock the storage box. The lock mechanism includes an operation device to be operated by a user to at least unlock the lock mechanism. The operation device is mounted in an outer wall of the storage box. The seat side cover includes a cutout or an opening to enable the user to operate the operation device from the outside of the motorcycle in the vehicle width direction with avoiding the seat side cover.

10 Claims, 7 Drawing Sheets

MOTORCYCLE

CROSS-REFERENCE TO RELATED APPLICATIONS

The present application claims priority under 35 U.S.C. §119 to Japanese Patent Application No. 2012-169956, filed Jul. 31, 2012. The contents of this application are incorporated herein by reference in their entirety.

BACKGROUND OF THE INVENTION

1. Field of the Invention

The present invention relates to a motorcycle.

2. Discussion of the Background

A motorcycle that has a storage box placed below a seat which is placed between the front wheel and the rear wheel and a lock mechanism provided on a body cover covering the surroundings of the storage box below the seat for locking and unlocking the storage box is known in the related art (see JP-A No. 2001-63660).

The motorcycle in the related art is a scooter-type vehicle having a flat step floor, in which a keyhole (operation unit) of a key cylinder making up part of the lock mechanism is exposed on the body cover located between the step floor and the seat, so that the key can be inserted into the keyhole in the direction from the front of the vehicle toward the back by use of the space opened above the step floor to operate the lock mechanism.

Such placement of the keyhole provides favorable external appearance because the keyhole is mounted in an inconspicuous position in external appearance.

SUMMARY OF THE INVENTION

According to one aspect of the present invention, a motorcycle includes a body frame, a seat, a seat side cover, and a storage box. The body frame extends rearward from a head pipe and extends between a front wheel and a rear wheel in a vehicle longitudinal direction of the motorcycle. The seat is supported on a rear portion of the body frame. The storage box is placed below the seat. The storage box is covered with the seat side cover from an outside of the motorcycle in a vehicle width direction of the motorcycle. The lock mechanism is provided to lock and unlock the storage box. The lock mechanism includes an operation device to be operated by a user to at least unlock the lock mechanism. The operation device is mounted in an outer wall of the storage box. The seat side cover includes a cutout or an opening to enable the user to operate the operation device from the outside of the motorcycle in the vehicle width direction with avoiding the seat side cover.

According to another aspect of the present invention, a motorcycle includes a body frame, a seat, a seat side cover, a storage box, and a lock mechanism. The body frame includes main frames, seat frames, pivot plates, and reinforcing pipes. The main frames extend rearward from a head pipe. The seat frames extend at rear of the main frames in a vehicle longitudinal direction of the motorcycle and extend between a front wheel and a rear wheel in the vehicle longitudinal direction. The pivot plates extend downward from rear portions of the main frames. The reinforcing pipes extend below the seat frames from the pivot plates in an obliquely rearward and upward direction of the motorcycle to be connected to the seat frames. The seat is supported on the seat frames. The storage box is placed below the seat. The storage box is covered with the seat side cover from an outside of the motorcycle in a vehicle width direction of the motorcycle. The lock mechanism is provided to unlock and lock the storage box. The lock mechanism includes an operation device to be operated by a user to at least unlock the lock mechanism. The operation device is mounted in an outer wall of the storage box. At least a part of a lower edge of the seat side cover is located at a distance from the reinforcing pipes in an upward direction of the motorcycle to enable the user to operate the operation device from the outside of the motorcycle in the vehicle width direction through clearance between the reinforcing pipes and at least the part of the lower edge of the seat side cover.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

It is to be noted that, in the drawings referred to in the following description, arrow FR indicates the front of the vehicle, arrow UP indicates the upper side of the vehicle, and arrow LH indicates the left of the vehicle.

First Embodiment

Figure 1:
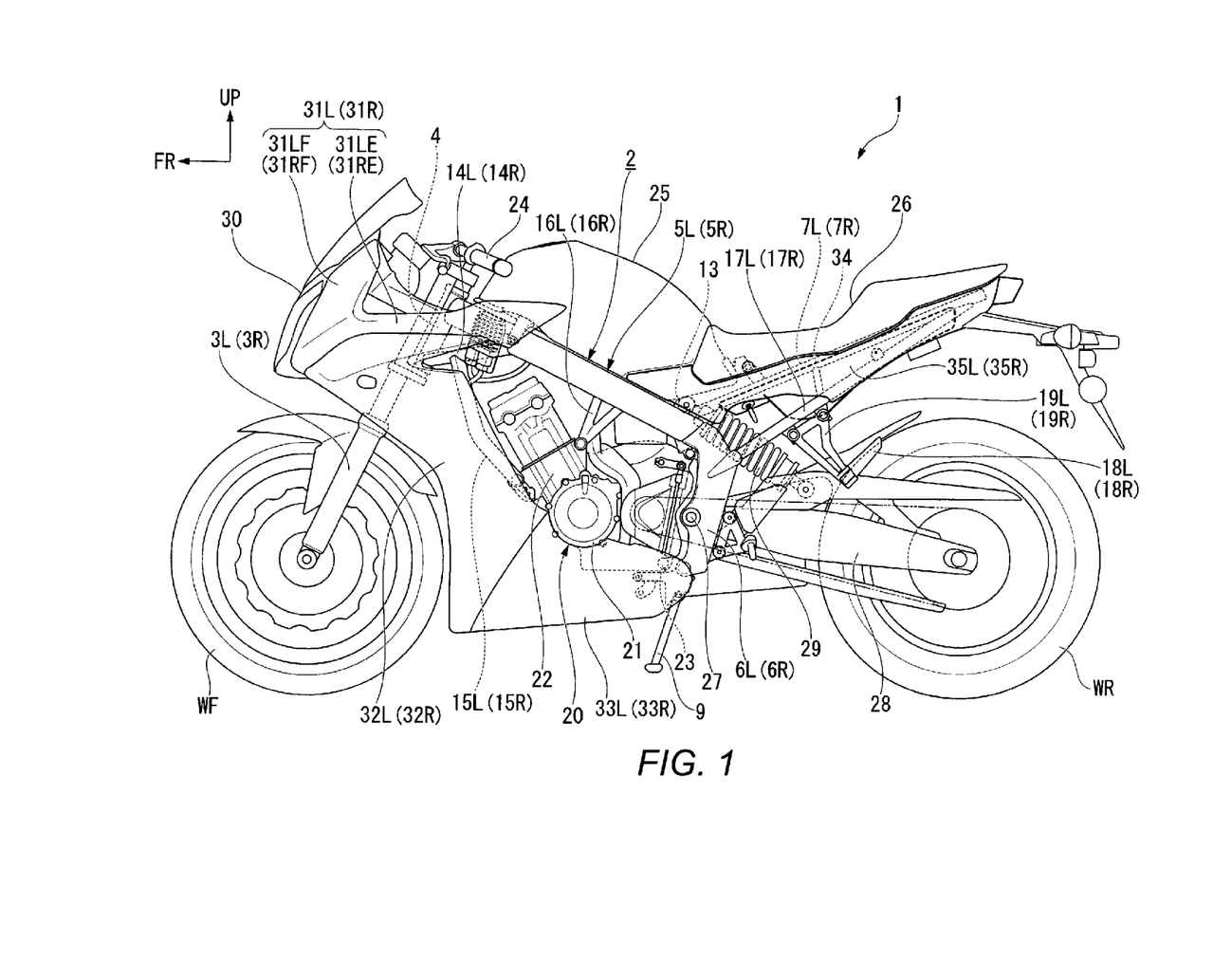
FIG. 1 is a left side view of a motorcycle according to a first embodiment.
Figure 2:
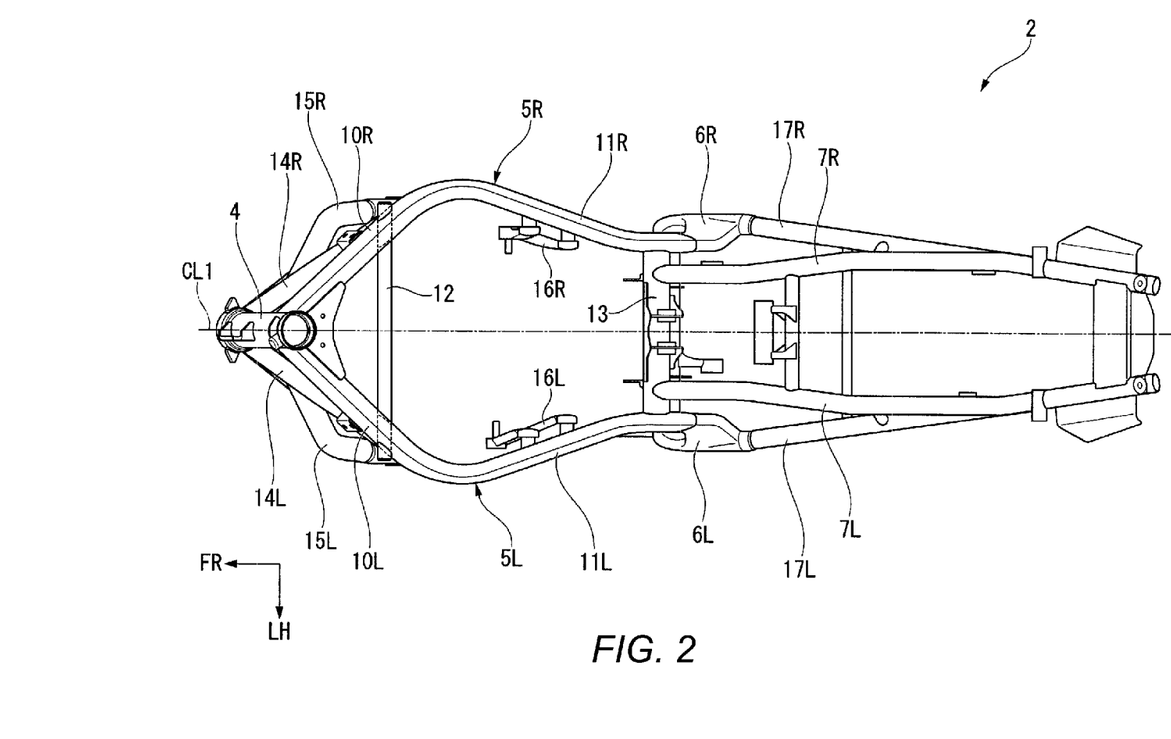
FIG. 2 is a top view of a body frame of the motorcycle according to the first embodiment.

FIG. 1 shows a motorcycle 1 according to a first embodiment, while FIG. 2 shows a top view of a body frame 2 of the motorcycle 1. The body frame 2 of the motorcycle 1 includes a head pipe 4 rotatably supporting a pair of left and right front forks 3L, 3R, a pair of left and right main frames 5L, 5R diverging from the head pipe 4 to the right and left so as to extend in an obliquely rearward and downward direction, a pair of left and right pivot plates 6L, 6R extending downward from the rear ends of the main frames 5L, 5R, and seat frames 7L, 7R longitudinally extending at the rear of the main frames 5L, 5R. In FIG. 1, members not appearing in the drawings are indicated by parenthesized signs for the sake of convenience in description.

As shown in FIG. 2, the main frames 5L, 5R have front extending portions 10L, 10R diverging from the head pipe 4 to extend rearward and also outward in the vehicle width direction, and rear extending portions 11L, 11R adjoining the rear ends of the front extending portions 10L, 10R and extending rearward and also inward in the vehicle width direction. A front cross frame 12 for connection between the front extending portions 10L, 10R lays between rear portions of the front extending portions 10L, 10R. A rear cross frame 13 lays between rear portions of the rear extending portions 11L, 11R for connection between the rear extending portions 11L, 11R. The front ends of the seat frames 7L, 7R are connected to the rear cross frame 13. The seat frames 7L, 7R extend from the rear cross frame 13 in an obliquely rearward and upward direction.

A pair of left and right gusset pipes 14L, 14R extends from a lower portion of the head pipe 4 in an obliquely rearward and upward direction. The rear ends of the gusset pipes 14L, 14R are connected to the rear portion of the front extending portions 10L, 10R of the main frame 5L, 5R. The gusset pipes 14L, 14R are respectively connected to a pair of left and right down frames 15L, 15R extending in an obliquely rearward and downward direction. A pair of left and right cylinder hangers 16L, 16R extending downward are secured to approximately longitudinally central areas of the rear extending portions 11L, 11R of the main frames 5L, 5R.

A pair of left and right reinforcing pipes 17L, 17R are connected to the pivot plates 6L, 6R. The reinforcing pipes 17L, 17R extend below the seat frames 7L, 7R in an obliquely rearward and upward direction to be connected to the rear ends of the seat frames 7L, 7R. As shown in FIG. 2, the areas from the front ends to the approximate longitudinal centers of the reinforcing pipes 17L, 17R are located more outward in the vehicle width direction than the seat frames 7L, 7R are located as viewed from the top. The left and right reinforcing pipes 17L, 17R extend rearward in such a manner as to gradually decrease the distance from each other in the vehicle width direction. Specifically, in the embodiment, the distance between the left and right seat frames 7L, 7R is set to be smaller than the distance between the left and right reinforcing pipes 17L, 17R.

Further, as shown in FIG. 1, step stays 19L, 19R supporting at lower ends pillion steps 18L, 18R on which the pillion passenger is to place his/her feet are respectively secured to front portions of the reinforcing pipes 17L, 17R so as to extend downward.

A side stand 9 is provided on a lower portion of the left pivot plate 6L. The side stand 9 supports the motorcycle 1 in a position somewhat tilted to the left.

Referring to FIG. 1, an engine 20 is supported below the main frames 5L, 5R. The embodiment adopts a multi-cylinder in-line engine as the engine 20. The engine 20 includes a crankcase 21, and a cylinder unit 22 extending from a front upper portion of the crankcase 21 in an obliquely forward and upward direction.

The engine 20 has a front portion of the cylinder unit 22 supported by lower portions of the down frames 15L, 15R, and a rear portion of the cylinder unit 22 supported by lower portions of the cylinder hangers 16L, 16R. In addition, the engine 20 has a rear portion of the crankcase 21 supported by a support shaft 23 laying between lower portions of the pivot plates 6L, 6R.

A front wheel WF is rotatably supported between lower portions of the left and right front forks 3L, 3R rotatably supported at the head pipe 4. A steering handlebar 24 is provided on upper portions of the front forks 3L, 3R. A fuel tank 25 is supported on upper portions of the main frames 5L, 5R at the rear of the head pipe 4. A seat 26 on which an occupant is to sit is placed at the rear of the fuel tank 25. The seat 26 extends along the seat frames 7L, 7R in the longitudinal direction and is supported by the seat frames 7L, 7R.

A pivot shaft 27 is placed to lay between approximately vertically central areas of the pivot plates 6L, 6R. A vertically swingable swing arm 28 is supported by the pivot shaft 27. A rear wheel WR is rotatably supported at the rear end of the swing arm 28. Then, a rear cushion 29 is mounted between the swing arm 28 and the rear cross frame 13.

The body cover includes a front cover 30 that is placed in front of the head pipe 4, has a fixed width in the vehicle width direction and extends in an obliquely rearward and upward direction. A pair of left and right tank shrouds 31L, 31R, which are contiguous with the left and right edges of the front cover 30 and extend rearward, are placed on the lateral sides of the head pipe 4. In addition, a pair of left and right front side covers 32L, 32R, which are contiguous with the tank shrouds 31L, 31R and extend downward, are placed beneath the tank shrouds 31L, 31R.

The tank shrouds 31L, 31R are formed respectively to have integrated combinations of front contiguous portions 31LF, 31RF that are long in the up-and-down direction and extend fully along the left and right edges of the front cover 30 in the up-and-down direction, and rear extending portions 31LE, 31RE that extend rearward from an approximately vertically central position of the front contiguous portions 31LF, 31RF to have rear ends formed in a shape tapering down toward the tip. The rear ends of the rear extending portions 31LE, 31RE reach respectively front side faces of the fuel tank 25 so as to cover the front side faces of the fuel tank 25.

The front side covers 32L, 32R have respectively upper edges contiguous and along with both lower edges of the front contiguous portions 31LF, 31RF and the rear extending portions 31LE, 31RE of the tank shrouds 31L, 31R, and extend downward. In the front side covers 32L, 32R, front edges, which extend downward from the front ends of the respective upper edges, are formed in an arc shape along the front wheel WF, and rear edges, which extend downward from the rear ends of the respective upper edges, extend downward along the down frames 15L, 15R.

In turn, a pair of left and right under cowls 33L, 33R are contiguous with lower portions of the front side covers 32L, 32R. The under cowls 33L, 33R extend rearward to reach lower portions of the pivot plates 6L, 6R so as to cover a lower portion of the crankcase 21.

In the vehicle rear section, the storage box 34 is placed below the seat 26. The storage box 34 extends longitudinally along the seat frames 7L, 7R. Then, the storage box 34 is covered with a pair of left and right seat side covers 35L, 35R from the outside in the vehicle width direction. The seat side covers 35L, 35R respectively extend below the seat 26 in an obliquely rearward and upward direction along the seat frames 7L, 7R and the reinforcing pipes 17L, 17R.

The front ends of the seat side covers 35L, 35R extend out from the front portions of the seat frames 7L, 7R in the upward direction so as to cover the rear side faces of the fuel tank 25. The rear ends of the seat side covers 35L, 35R extend to underneath the rear end of the seat 26.

In the motorcycle 1, an upward-facing opening of the storage box 34 appears when demounting the seat 26. In this state, an article/item can be put into the storage box 34 from above. Note that the embodiment describes the case of the storage box 34 opened by demounting the entire seat 26 from the vehicle body. However, for example, the seat 26 may be structured to be rotatably moved by using a front portion or a rear portion of the seat 26 as a pivot for removal of the seat 26.

Figure 3:
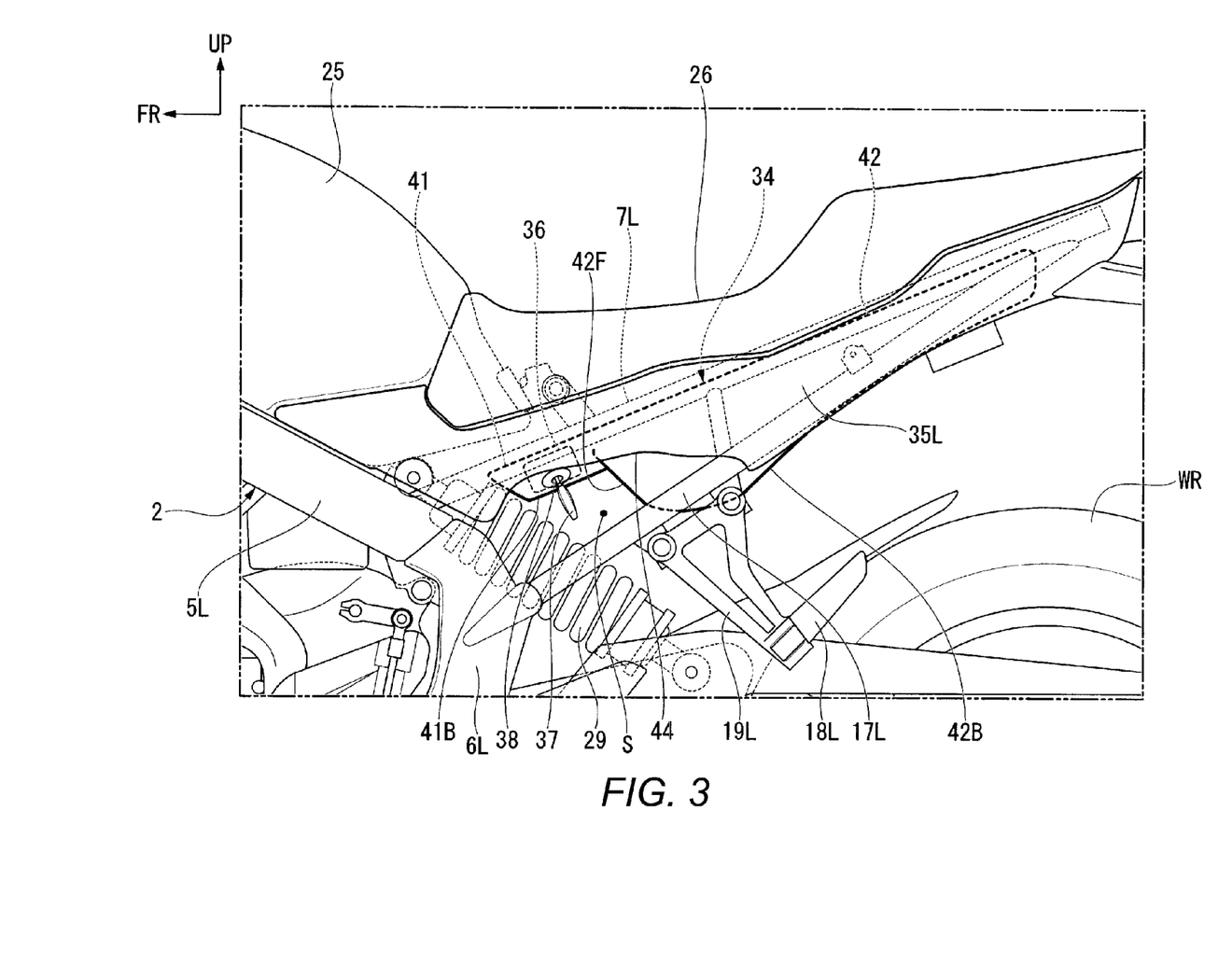
FIG. 3 is a left side view of a rear section of the motorcycle according to the first embodiment.
Figure 4:
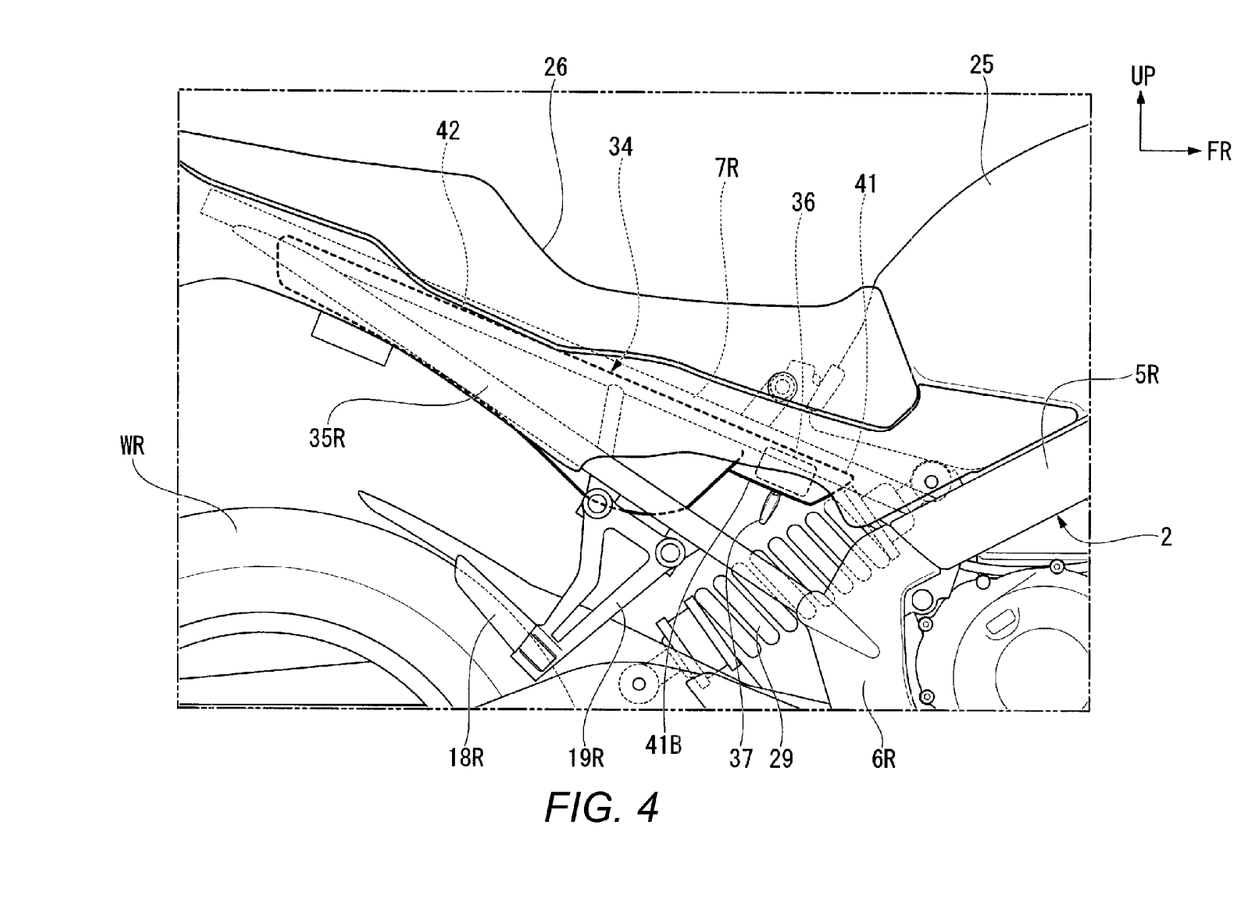
FIG. 4 is a right side view of the rear section of the motorcycle according to the first embodiment.

In the embodiment, the removal of the seat 26 is restricted by a lock mechanism and the lock mechanism lifts the restriction on the removal of the seat 26. In other words, the lock mechanism unlocks and locks the storage box 34. As shown in FIG. 3 and FIG. 4, in the embodiment, a key cylinder 36 forming a part of the lock mechanism is accommodated in the storage box 34, and a keyhole 38, which is an operation unit enabling the insertion of a key 37 into the key cylinder 36, is provided to be exposed on the external wall of the storage box 34.

Further, the lock mechanism includes, for example, a fastening unit (latch or the like) for fastening the seat 26 to render it unremovable, and is structured such that the fastening state of the fastening unit is unfastened through a wire or the like by key operation performed on the key cylinder 36 in order to accept the removal of the seat 26. In this regard, the structure of the lock mechanism is not limited to a structure using a key cylinder as described above, and, for example, a hand-operated lever or the like may be used.

Further, the embodiment is structured such that, when the seat 26 is mounted on the vehicle body side, the lock mechanism automatically locks the seat 26, and the key cylinder 36 is operated only for unlocking. However, the lock may be both undone and applied through the operation performed on the key cylinder 36.

In the embodiment, the storage box 34 has a front storage 41 located below the front portions of the seat frames 7L, 7R, and a main storage 42 extending rearward directly from the front storage 41 and formed to have a deeper storing space (a greater distance from the top to the bottom) than the front storage 41. The key cylinder 36 is accommodated in the front storage 41. The keyhole 38 is placed to be exposed on a bottom wall 41B of the front storage 41. The upper edges of the front storage 41 and the main storage 42 are contiguous with each other to form an opening for receiving an article/item, and overlap with the seat frames 7L, 7R in side view.

Figure 5:
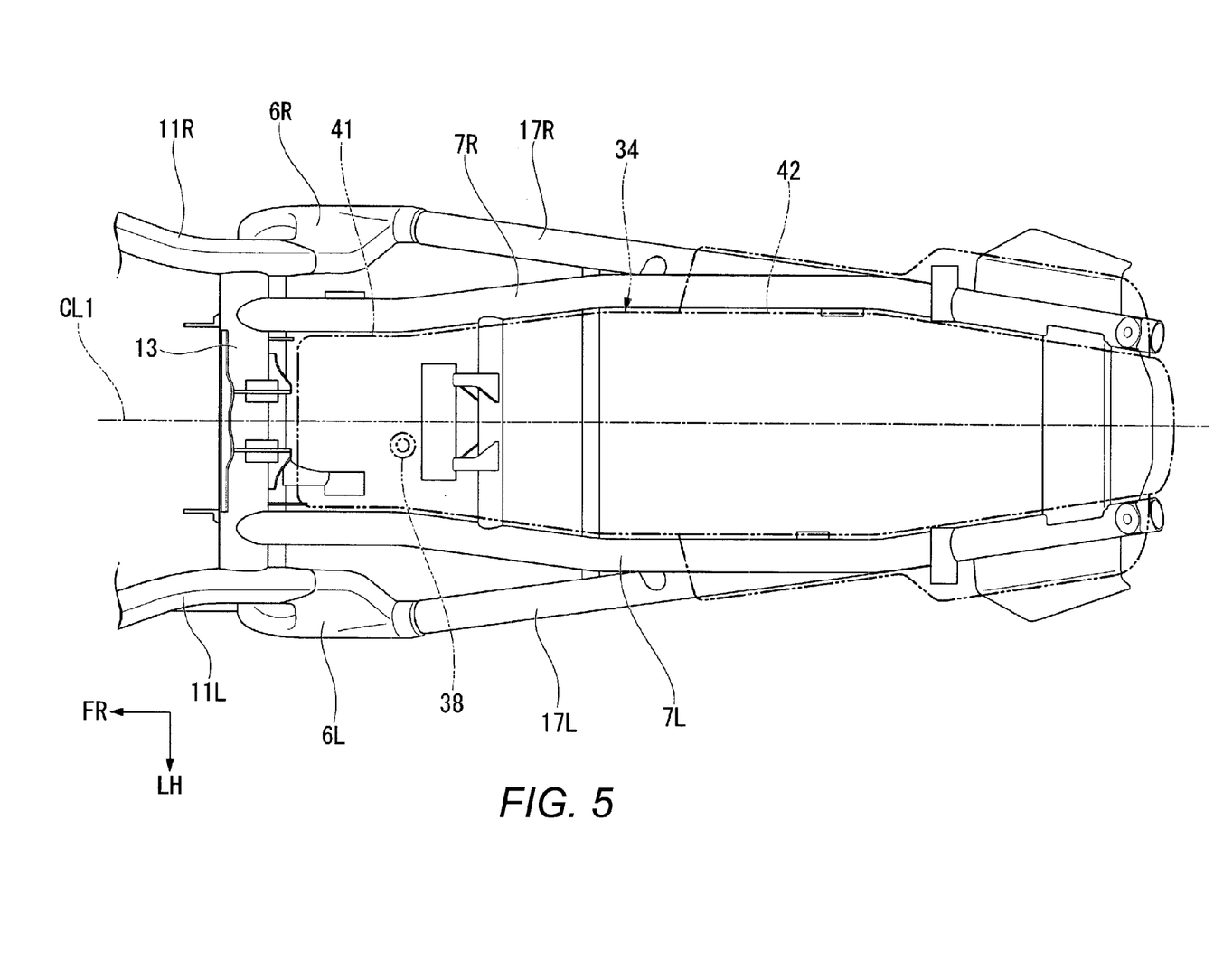
FIG. 5 is a top view of a rear portion of the body frame of the motorcycle according to the first embodiment.

FIG. 5 shows an outline of the storage box 34 in a phantom line for the sake of convenience in description. As shown in FIG. 5, the storage box 34 is placed between the left and right seat frames 7L, 7R and also between the reinforcing pipes 17L, 17R. In FIG. 5, the areas protruding leftward and rightward from the rear portion of the storage box 34 represent support flanges.

Referring to FIG. 3 and FIG. 4, the bottom wall 41B of the front storage 41 is located between the seat frames 7L, 7R and the reinforcing pipes 17L, 17R in side view, and extends longitudinally along the seat frames 7L, 7R at a downward distance from the seat frames 7L, 7R. Accordingly, as viewed in the side view, the keyhole 38 is placed in an approximately triangle space enclosed by the pivot plate 6L, the seat frame 7L and the reinforcing pipe 17L.

On the other hand, a bottom wall 42B of the main storage 42 extends longitudinally along the reinforcing pipes 17L, 17R. Also, a front wall 42F of the main storage 42, which extends upward from the front end of the bottom wall 42B of the main storage 42 to be connected to the rear end of the bottom wall 41B of the front storage 41, is connected to the bottom wall 41B of the front storage 41 to form a substantially right angle. The front wall 42F covers the keyhole 38 from the rear.

In this regard, in the embodiment, a cutout 44 is formed in the seat side cover 35L. The cutout 44 enables the user to operate the keyhole 38 from the outside in the vehicle width direction while avoiding the seat side cover 35L.

Specifically, a rear portion of the seat side cover 35L is formed to extend longitudinally between the sear frame 7L and the reinforcing pipe 17L, and covers the seat frame 7L, the reinforcing pipe 17L and the storage box 34 located inward of them from the outside in the vehicle width direction. On the other hand, a cutout 44 is formed in a front portion of the seat side cover 35L to be concave upward from the rear portion so that the reinforcing pipe 17L is exposed to the outside in side view.

In other words, the front portion of the lower edge of the seat side cover 35L is located at a distance from the reinforcing pipe 17L in the upward direction, so that clearance S is created between the front portion of the lower edge of the seat side cover 35L and the reinforcing pipe 17L.

At such a cutout 44 (clearance S), the bottom wall 41B of the front storage 41 and the front portion of the main storage 42 in the storage box 34 are exposed to the outside in side view, and further the keyhole 38 mounted in the bottom wall 41B of the front storage 41 is exposed to the outside in side view. As a result, the embodiment makes it possible to operate the keyhole 38 mounted in the bottom wall 41B of the front storage 41 from the outside in the vehicle width direction while avoiding the seat side cover 35L.

Here, in the embodiment, the bottom wall 41B of the front storage 41 in which the keyhole 38 is provided is located in a position close to an edge of the cutout 44 and inward of the edge in the vehicle width direction, which is equal to the placement of the keyhole 38 into the area in the vicinity of the edge.

Discussing the keyhole 38 in more detail, as shown in FIG. 5, the keyhole 38 is placed between the left and right seat frames 7L, 7R and also between the left and right reinforcing pipes 17L, 17R, and is situated leftward of the center line CL1 in the vehicle width direction. As is clear from FIG. 1, the keyhole 38 is placed between the rear end of the front wheel WF and the front end of the rear wheel WR.

Further, referring to FIG. 3, an area of the bottom wall 41B of the front storage 41 extending from the left end toward the center in the vehicle width direction is inclined to extend gently obliquely downward from the left end (from the outside in the vehicle width direction) toward the center in the vehicle width direction (toward inside in the vehicle width direction). The keyhole 38 is structured to receive the key 37 along a direction perpendicular to the above-described area extending from the left end toward the center in the vehicle width direction of the bottom wall 41B of the front storage 41.

Because of this, in the embodiment, the keyhole 38 is placed in a position enabling the obliquely upward insertion of the key 37 from one side in the vehicle width direction toward the other side. Because the bottom wall 41B of the front storage 41 is inclined rearward and upward, the embodiment places the keyhole 38 in a position enabling the obliquely upward insertion of the key 37 from one side in the vehicle width direction toward the other side, and also in a position enabling the obliquely upward insertion of the key 37 from the rear toward the front of the vehicle.

In the embodiment, a cutout similar to the cutout 44 is formed in the seat side cover 35R. However, the right cutout is not necessarily formed.

In the motorcycle 1 in the first embodiment having the above-described structure, the keyhole 38 of the lock mechanism is mounted in the outer wall of the storage box 34 covered with the seat side cover 35L in order to make the keyhole 38 inconspicuous in external appearance for favorable external appearance of the vehicle. In addition, the keyhole 38 is made operable from the outside in the vehicle width direction to achieve satisfactory operational ease of the keyhole 38.

Since the keyhole 38 is placed in the space enclosed by the pivot plate 6L, the seat frame 7L and the reinforcing pipe 17L in side view in the embodiment, the keyhole 38 can be well protected in a side-impact collision. Further, since the distance between the left and right seat frames 7L, 7R is set smaller than the distance between the left and right reinforcing pipes 17L, 17R, and the keyhole 38 is placed between the left and right seat frames 7L, 7R and also between the left and right reinforcing pipes 17L, 17R, the range of protection of the keyhole 38 can be expanded to enhance the protection effect.

Also, the embodiment places the keyhole 38 between the rear end of the front wheel WF and the front end of the rear wheel WR. Because of this, the keyhole 38 can be made inconspicuous as much as possible in the center in the vehicle longitudinal direction, resulting in reliably excellent external appearance of the vehicle.

Also, in the embodiment, the keyhole 38 is placed in a position enabling the obliquely upward insertion of the key 37 from one side in the vehicle width direction toward the other side. In this case, since the entire keyhole 38 is difficult to see, and no load is placed on operation as compared with the case where a key is inserted directly upward from directly underneath the keyhole, the external appearance of the vehicle can be made excellent with reliability and also the operational ease for the keyhole 38 can be more enhanced.

Second Embodiment

A second embodiment is described with reference to FIG. 6 and FIG. 7. The same elements as those in the first embodiment are indicated by the same signs and the description is omitted.

Figure 6:
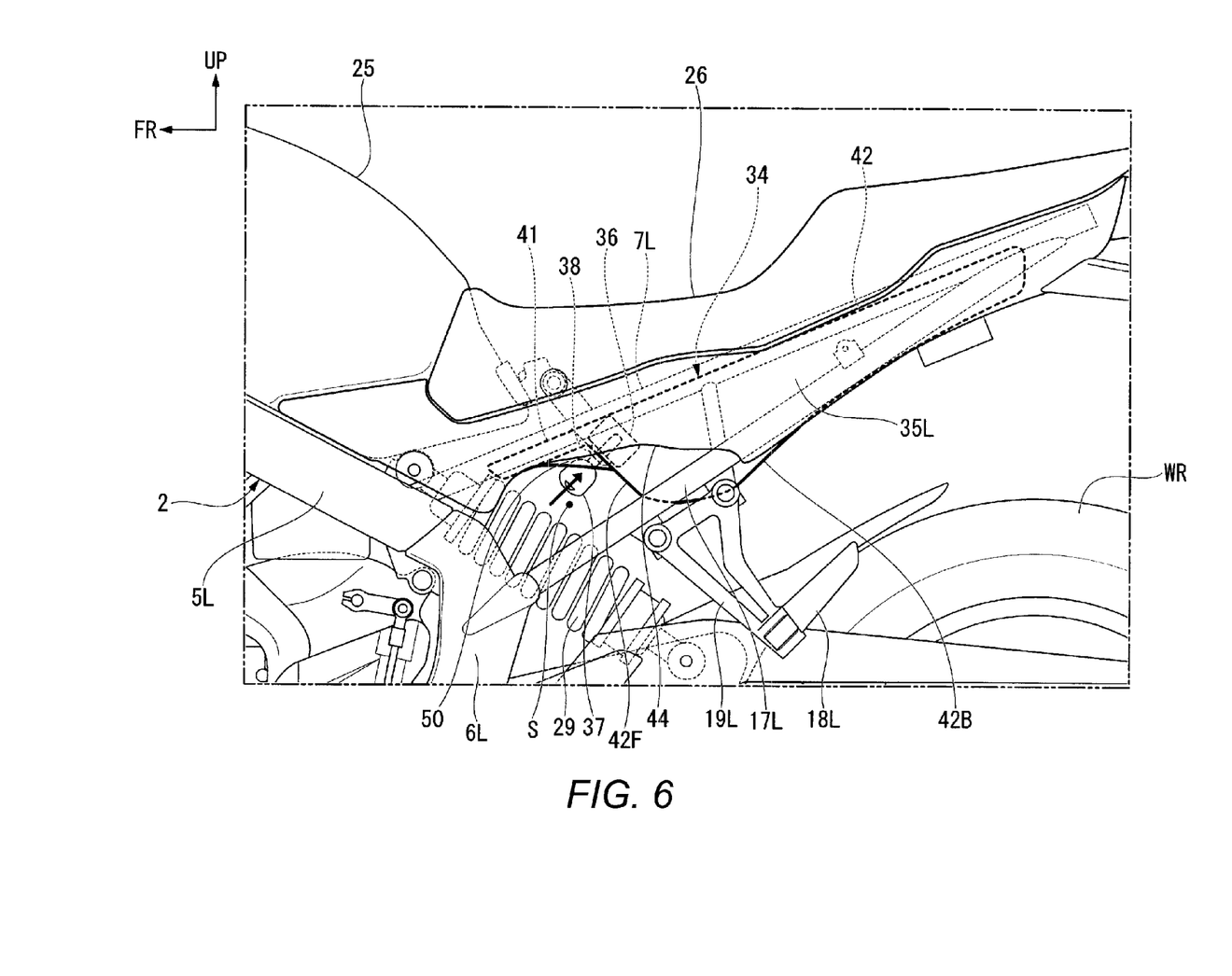
FIG. 6 is a left side view of a rear section of a motorcycle according to a second embodiment.
Figure 7:
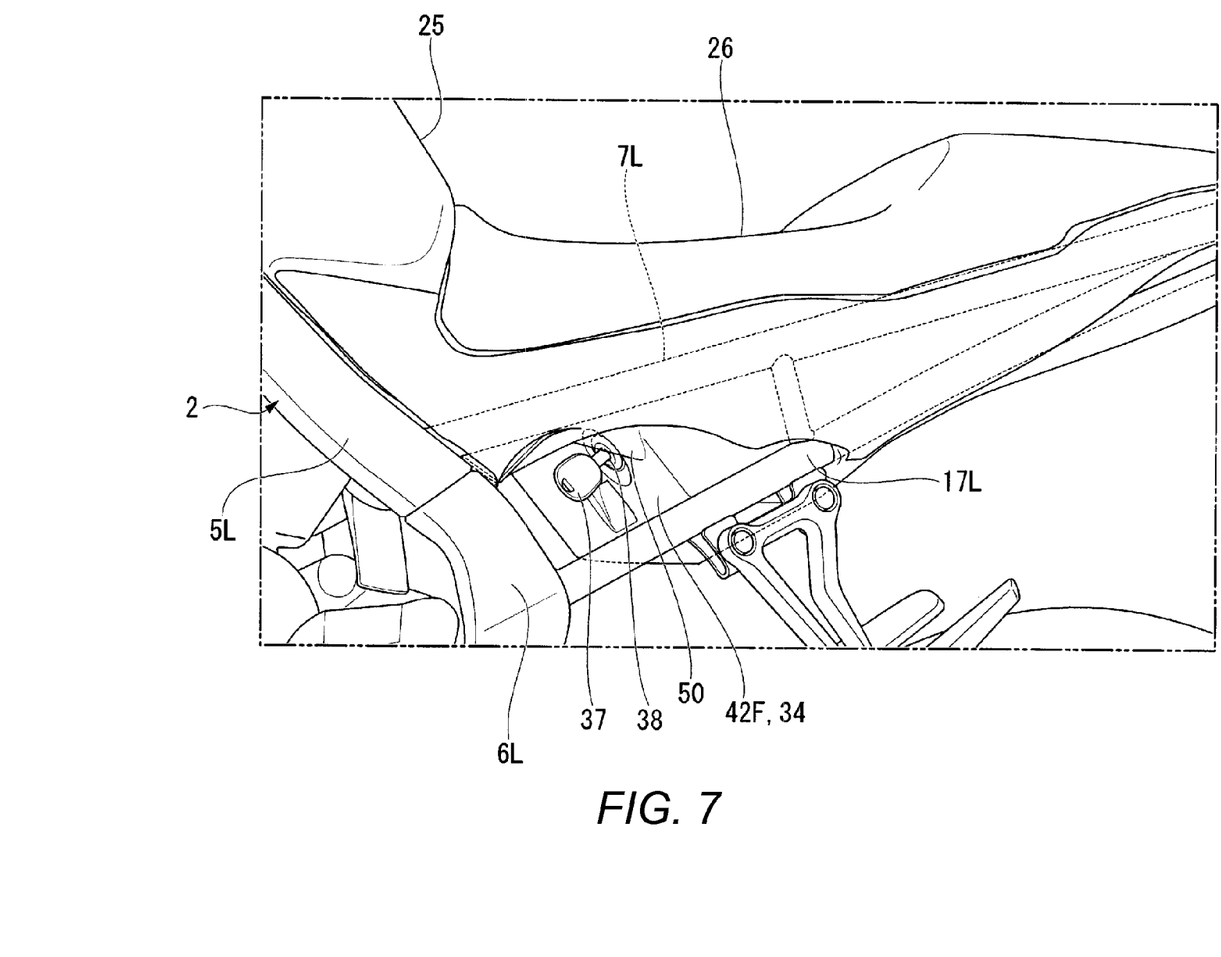
FIG. 7 is a perspective view of the rear section of the motorcycle according to the second embodiment.

As shown in FIG. 6, the front portion of the main storage 42 in the storage box 34 is exposed to the outside through the cutout 44 (clearance S) in side view, but the bottom wall 41B of the front storage 41 extends along the edge of the cutout 44, so that the bottom wall 41B is not exposed to the outside in side view. The key cylinder 36 is mounted in the front portion of the main storage 42 in the storage box 34 and also at the rear of the front wall 42F. As shown in FIG. 7, the keyhole 38 is placed to be exposed on the front wall 42F. Specifically, the keyhole 38 is mounted in the front wall 42F situated inward in the vehicle width direction of the edge of the cutout 44 and also close to the edge.

Further, in the embodiment, the front wall 42F of the main storage 42 in the storage box 34 extends approximately straight in the vehicle width direction, and the outer surface of the front wall 42F faces in an obliquely forward and downward direction. The keyhole 38 is designed to receive the key 37 along the direction perpendicular to the outer surface of the front wall 42F. Because of this, in the embodiment, as seen from the arrow in FIG. 6, the keyhole 38 is placed in a position enabling the obliquely upward insertion of the key 37 in the direction from the front toward the rear of the vehicle, where the keyhole 38 can be barely visible in side view.

In addition, in the embodiment, on the left side of the keyhole 38, a rib 50 triangularly shaped in side view is formed to extend astride the bottom wall 41B of the front storage 41 and the front wall 42F of the main storage 42 in the storage box 34 so as to cover the keyhole 38 from left.

In such structure according to the second embodiment, the keyhole 38 is designed to be inconspicuous as much as possible when viewed from the outside in the vehicle width direction in order to offer reliably satisfactory external appearance of the vehicle.

Up to this point the embodiments have been described, but the present invention is not limited to the aforementioned embodiments and various changes can be made without departing from the scope of the invention.

For example, each of the aforementioned embodiments has described the structure that enables the user to operate the keyhole 38 while avoiding the seat side cover 35L by forming the cutout 44 in the left seat side cover 35L. However, the cutout may be formed in the right seat side cover 35R. Specifically, such a cutout may be formed in both or either of the left and right seat side covers. Instead, for example, an opening of a circular shape, a rectangular shape or the like may be formed in at least one of the seat side covers 35L, 35R to enable the user to operate the keyhole 38 with avoiding the seat side covers 35L, 35R.

Further, in each of the aforementioned embodiments, a part of the outer wall of the storage box 34 is exposed (uncovered) to the outside in side view through the cutout 44 formed in the left seat side cover 35L, and the keyhole 38 which is an operation unit is placed in the exposed (uncovered) part. However, in the embodiment of the present invention, such an area in which the operation unit may be placed is not necessarily exposed on the seat side cover.

Specifically, the operation unit may be mounted in an area of the outer wall of the storage box situated inward, in the vehicle width direction, of and close to an edge of a cutout or opening of the seat side cover or an edge of the seat side cover on which clearance is created, in which the area is not exposed on the seat side cover in side view. In this case, since the operation unit can be easily operated from the outside in the vehicle width direction as long as the operation unit is located in close proximity to the edge, this makes it possible to retain satisfactory operational ease of the operation unit.

The embodiments have described the example that the storage box 34 is opened with the opening facing upward, the storage box 34 is covered from above with the seat 26, and the lock mechanism restricts the removal of the seat 26 in order to lock the storage box 34. However, for example, a lid may be provided for opening/closing the storage box 34 and such a lid can be locked/unlocked by the lock mechanism.

As the storage box 34, the embodiments have described the example that has a space into which articles/items can be freely stored. Storage boxes according to the embodiment include a storage box having a storage space housing electrical equipment and/or the like and no room for freely storing articles/items, and a storage box which is opened by dismounting the seat and/or the like for maintenance in the main.

In a motorcycle according to a first aspect of the embodiment, a body frame (2) extending rearward from a head pipe (4) extends between a front wheel (WF) and a rear wheel (WR) in a vehicle longitudinal direction, a seat (26) is supported on a rear portion of the body frame (2), a storage box (34) is placed below the seat (26), and the storage box (34) is covered with a seat side cover (35L) from the outside in a vehicle width direction. The motorcycle is provided with a lock mechanism (36) provided for locking and unlocking the storage box (34). The lock mechanism (36) has an operation unit (38) operated by a user to at least unlock the lock mechanism (36). The operation unit (38) is mounted in an outer wall of the storage box (34). The seat side cover (35L) has either a cutout or an opening formed therein to enable the user to operate the operation unit (38) from the outside in the vehicle width direction with avoiding the seat side cover (35L).

In a motorcycle according to a second aspect of the embodiment, a body frame (2) that has main frames (5L, 5R) extending rearward from a head pipe (4) and seat frames (7L, 7R) extending at rear of the main frames (5L, 5R) in a vehicle longitudinal direction extends between a front wheel (WF) and a rear wheel (WR) in the vehicle longitudinal direction, a seat (26) is supported on the seat frames (7L, 7R), a storage box (34) is placed below the seat (26), and the storage box (34) is covered with a seat side cover (35L) from the outside in a vehicle width direction. The body frame (2) further includes pivot plates (6L, 6R) extending downward from rear portions of the main frames (5L, 5R) and reinforcing pipes (17L, 17R) extending below the seat frames (7L, 7R) from the pivot plates (6L, 6R) in an obliquely rearward and upward direction to be connected to the seat frames (7L, 7R). The motorcycle is provided with a lock mechanism (36) provided for unlocking and locking the storage box (34). The lock mechanism (36) has an operation unit (38) operated by a user to at least unlock the lock mechanism (36). The operation unit (38) is mounted in an outer wall of the storage box (34). At least a part of a lower edge of the seat side cover (35L) is located at a distance from the reinforcing pipes (17L, 17R) in an upward direction in order to enable the user to operate the operation unit (38) from the outside in the vehicle width direction through clearance (S) between at least the part of the lower edge of the seat side cover (35L) and the reinforcing pipes (17L, 17R).

In a motorcycle according to a third aspect of the embodiment, the operation unit (38) is placed in a space enclosed by the pivot plates (6L, 6R), the seat frames (7L, 7R) and the reinforcing pipes (17L, 17R) in side view.

In a motorcycle according to a fourth aspect of the embodiment, the seat frames (7L, 7R) and the reinforcing pipes (17L, 17R) are provided in left-right pairs. A distance between the left and right seat frames (7L, 7R) is set to be smaller than a distance between the left and right reinforcing pipes (17L, 17R). The operation unit (38) is placed between the left and right seat frames (7L, 7R) and also between the left and right reinforcing pipes (17L, 17R).

In a motorcycle according to a fifth aspect of the embodiment, the operation unit (38) is placed between a rear end of the front wheel (WF) and a front end of the rear wheel (WR).

In a motorcycle according to a sixth aspect of the embodiment, the operation unit (38) is a keyhole capable of accepting insertion of a key. The keyhole is placed in a position enabling obliquely upward insertion of the key from one side in the vehicle width direction toward the other side.

In a motorcycle according to a seventh aspect of the embodiment, the operation unit (38) is a keyhole capable of accepting insertion of a key. The keyhole is placed in a position enabling obliquely upward insertion of the key from the front of the vehicle toward the rear of the vehicle.

According to the first aspect, since the operation unit of the lock mechanism is provided in the outer wall of the storage box covered with the seat side cover, the operation unit is made inconspicuous in external appearance for favorable external appearance of the vehicle. In addition, because of the recess or opening, the operation unit is made easily operable from the outside in the vehicle width direction to retain satisfactory operational ease of the operation unit.

According to the second aspect, since the operation unit of the lock mechanism is provided in the outer wall of the storage box covered with the seat side cover, the operation unit is made inconspicuous in external appearance for favorable external appearance of the vehicle. In addition, because of the clearance between the seat side cover and the reinforcing pipes, the operation unit is made operable from the outside in the vehicle width direction to retain satisfactory operational ease of the operation unit.

According to the third aspect, since the operation unit is placed in the space enclosed by the pivot plate, the seat frame and the reinforcing pipe, the operation unit can be well protected in a side-impact collision.

According to the fourth aspect, the range of protection of the operation unit in a side-impact collision can be expanded to enhance the protection effect.

According to the fifth aspect, the operation unit is made inconspicuous as much as possible in the center in the vehicle longitudinal direction, making it possible to achieve reliably excellent external appearance of the vehicle.

According to the sixth aspect, the entirety of the keyhole which is the operation unit is made difficult to see in order to achieve excellent external appearance of the vehicle with reliability. In addition, since no load is placed on operation as compared with the case where a key is inserted directly upward from directly underneath the keyhole, the operational ease for the operation unit can be more enhanced.

According to the seventh aspect, the keyhole which is the operation unit is designed to be inconspicuous as much as possible from the outside in the vehicle width direction, making it possible to achieve reliably excellent external appearance of the vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A motorcycle comprising:
   a body frame extending rearward from a head pipe and extending between a front wheel and a rear wheel in a vehicle longitudinal direction of the motorcycle;
   a seat supported on a rear portion of the body frame;
   a seat side cover;
   a storage box placed below the seat, the storage box being covered with the seat side cover from an outside of the motorcycle in a vehicle width direction of the motorcycle; and
   a lock mechanism provided to lock and unlock the storage box, the lock mechanism including an operation device to be operated by a user to at least unlock the lock mechanism, the operation device being mounted in an outer wall of the storage box, the seat side cover including a cutout or an opening to enable the user to operate the operation device from the outside of the motorcycle in the vehicle width direction with avoiding the seat side cover.

2. The motorcycle according to claim 1, wherein the operation device is placed between a rear end of the front wheel and a front end of the rear wheel.

3. The motorcycle according to claim 1,
   wherein the operation device comprises a keyhole to accept insertion of a key, and
   wherein the keyhole is placed in a position enabling obliquely upward insertion of the key from one side in the vehicle width direction toward another side.

4. The motorcycle according to claim 1,
   wherein the operation device comprises a keyhole to accept insertion of a key, and
   wherein the keyhole is placed in a position enabling obliquely upward insertion of the key from a front of the motorcycle toward a rear of the motorcycle.

5. A motorcycle comprising:
   a body frame comprising:
      main frames extending rearward from a head pipe;
      seat frames extending at rear of the main frames in a vehicle longitudinal direction of the motorcycle and extending between a front wheel and a rear wheel in the vehicle longitudinal direction;
      pivot plates extending downward from rear portions of the main frames; and
      reinforcing pipes extending below the seat frames from the pivot plates in an obliquely rearward and upward direction of the motorcycle to be connected to the seat frames;
   a seat supported on the seat frames;
   a seat side cover;

a storage box placed below the seat, the storage box being covered with the seat side cover from an outside of the motorcycle in a vehicle width direction of the motorcycle; and a lock mechanism provided to unlock and lock the storage box, the lock mechanism including an operation device to be operated by a user to at least unlock the lock mechanism, the operation device being mounted in an outer wall of the storage box, at least a part of a lower edge of the seat side cover being located at a distance from the reinforcing pipes in an upward direction of the motorcycle to enable the user to operate the operation device from the outside of the motorcycle in the vehicle width direction through clearance between the reinforcing pipes and at least the part of the lower edge of the seat side cover.

6. The motorcycle according to claim 5, wherein the operation device is placed in a space enclosed by the pivot plates, the seat frames, and the reinforcing pipes when viewed from the vehicle width direction.

7. The motorcycle according to claim 6,
wherein the seat frames comprise a left seat frame and a right seat frame,
wherein the reinforcing pipes comprise a left reinforcing pipe and a right reinforcing pipe,
wherein a distance between the left and right seat frames is set to be smaller than a distance between the left and right reinforcing pipes, and
wherein the operation device is placed between the left and right seat frames and also between the left and right reinforcing pipes.

8. The motorcycle according to claim 5, wherein the operation device is placed between a rear end of the front wheel and a front end of the rear wheel.

9. The motorcycle according to claim 5,
wherein the operation device comprises a keyhole to accept insertion of a key, and
wherein the keyhole is placed in a position enabling obliquely upward insertion of the key from one side in the vehicle width direction toward another side.

10. The motorcycle according to claim 5,
wherein the operation device comprises a keyhole to accept insertion of a key, and
wherein the keyhole is placed in a position enabling obliquely upward insertion of the key from a front of the motorcycle toward a rear of the motorcycle.

* * * * *